Figure 1:
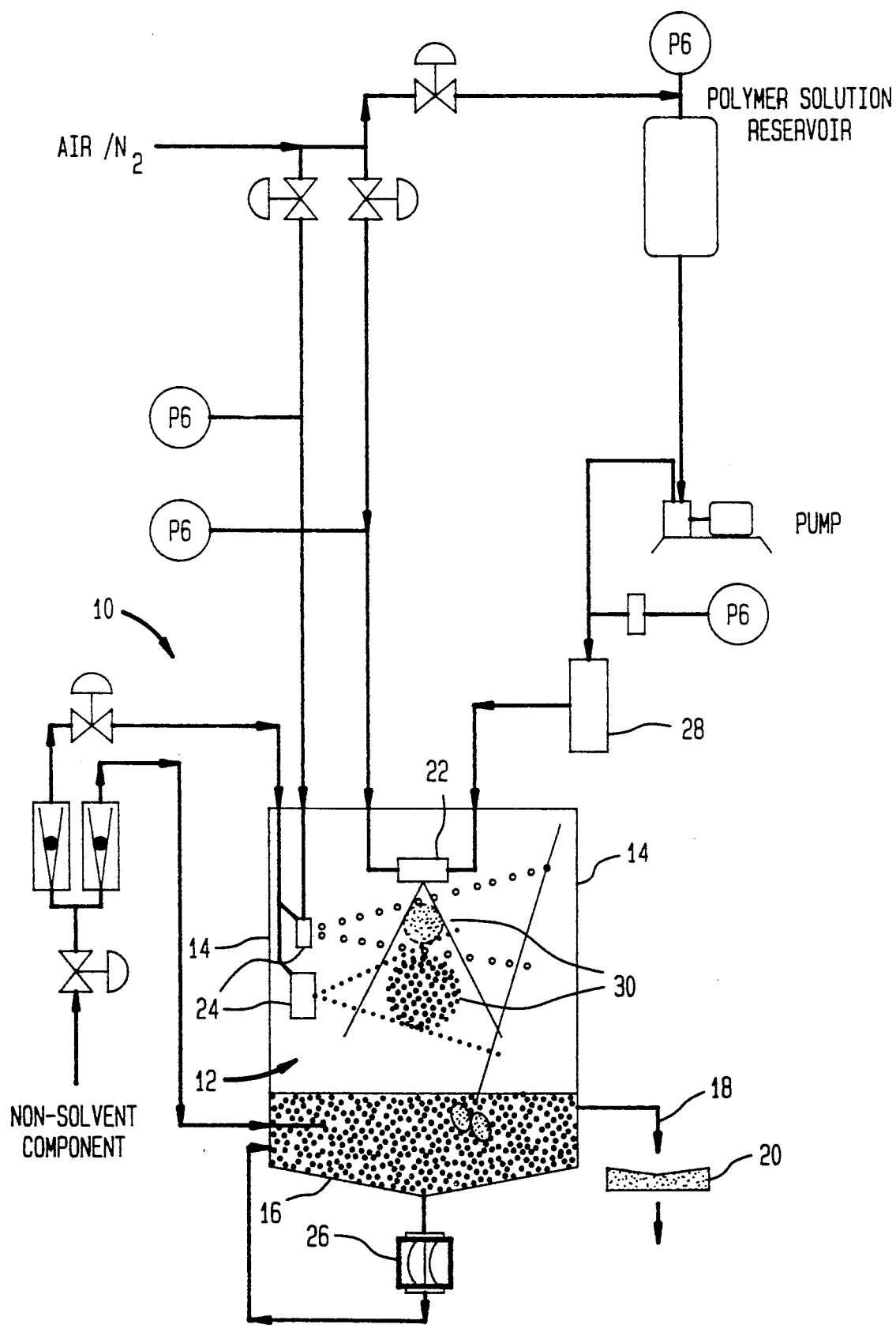

United States Patent [19]
Hughes et al.

[11] Patent Number: 5,147,895
[45] Date of Patent: Sep. 15, 1992

[54] HIGHLY POROUS COMPRESSIBLE POLYMERIC POWDERS

[75] Inventors: O. Richard Hughes, Chatham; Dieter Kurschus, Bayville, both of N.J.

[73] Assignee: Hoechst Celanese Corp., Somerville, N.J.

[21] Appl. No.: 810,611

[22] Filed: Dec. 19, 1991

[51] Int. Cl.[5] .............................. C08J 9/28; C08J 9/30; C08J 9/32
[52] U.S. Cl. .................................. 521/64; 521/56; 521/78; 521/182; 521/183; 521/184; 521/189
[58] Field of Search .................. 521/78, 64, 182, 183, 521/184, 189, 56

[56] References Cited

U.S. PATENT DOCUMENTS

| | | | |
|---|---|---|---|
| 3,960,583 | 6/1976 | Netting et al. | 521/78 |
| 4,422,877 | 12/1983 | Spitzer et al. | 521/78 |
| 4,628,067 | 12/1986 | Chen, Sr. et al. | 521/25 |
| 4,828,178 | 5/1989 | Tucker et al. | 239/223 |
| 4,996,240 | 2/1991 | Osipow et al. | 521/78 |

OTHER PUBLICATIONS

G. W. Halldin & M. R. Shah *Compaction of Polymer Powders* SPE, 39th ANTEL, Boston May 4–7, 1981 pp. 353–355.

George E. Long, AMP Inc. *Spraying Theory and Practice* "Chemical Engineering" Mar. 13, 1978 pp. 73–77.

S. C. Tsai, B. Viers, and D. Botts. *Effects of Pseudoplastic Behavior in Airblast Atomization of Viscous Liquids* ASME Fluids Eng. Div. (1988) vol. 75 pp. 225–231.

*Primary Examiner*—Morton Foelak
*Attorney, Agent, or Firm*—James M. Hunter, Jr.

[57] ABSTRACT

A process for forming polymer powders by dissolving one or more polymers in a suitable solvent, followed by atomizing the solution into a droplet atmosphere of a non-solvent to precipitate polymer particles. The particles are separated from the non-solvent, washed and dried to produce a powder with a rounded particle morphology, high internal porosity and surface area, and high apparent density.

Polymer powders with these properties can be pressed to dense shaped articles suitable for sintering in automated presses because the powders have good low and compressibility characteristics. The process if particularly useful when applied to soluble polymners that are not readily shaped by melt processing means.

20 Claims, 4 Drawing Sheets

HIGHLY POROUS COMPRESSIBLE POLYMERIC POWDERS

CROSS REFERENCE TO RELATED APPLICATION

The subject matter of this case is related to that of the copending application entitled "COMPACTIBLE POLYMERIC COMPOSITIONS," U.S. application Ser. No. 07/810,663 filed on Dec. 19, 1991.

TECHNICAL FIELD

The present invention relates to a process for making highly porous polymeric powders and more specifically to a process for making such powders from intractable polymers such that they are readily compactible to form shaped articles which may be sintered into high performance parts.

BACKGROUND ART

Polymers exhibiting very high melting points or very high viscosities above their melting points often times have very desirable properties such as chemical resistance, temperature resistance, high strength and a plethora of other characteristics needed for very high performance. A great difficulty, however, is that these polymers tend to be intractable, that is, not melt processable, wherein forming into shaped articles is expensive at best and impossible in many cases.

For example, nylons of hexamethylene diamine and terephthalic acid exhibit excellent temperature resistance but cannot be melt-spun because they decompose before their crystalline melting temperature is reached. Likewise, many other wholly aromatic polymers such as polyimides of pyromellitic anyhydride and aromatic diamines cannot be melt-processed in polyamic acid or fully imidized form.

One way of overcoming processing problems of high performance polymers, especially in connection with polybenzimidazoles is disclosed in U.S. Pat. No. 4,814,530 to Ward et al. The '530 patent describes a process for making articles by compacting melt-derived polybenzimidazole particuate resin under a pressure of about 2,000 to 10,000 psi while heating the constrained object to a temperature of 825° to 950° F. Melt-derived polybenzimidazole powder is produced by polymerizing an aromatic tetraamine and a diphenylester or an anhydride of an aromatic or heterocyclic dicarboxylic acid in a one or two stage process. In the two stage process, the monomers are heated at a temperature above about 170° C. in a first stage melt polymerization zone until a foamed prepolymer is formed. The formed prepolymer is cooled, pulverized and introduced into a second stage polymerization zone where it is heated again to yield a polybenzimidazole polymer product.

Commonly assigned U.S. Pat. No. 4,628,067, to Chen et al., incorporated herein by reference, discloses microporous polybenzimidazole particulates having a reduced bulk density, a surface area of at least 10 $m^2$/gm, a porosity of at least about 10%, and an average pore diameter ranging from about 50 to 500 Angstroms produced by the method of emulsification-precipitation or atomizing non-solvent quenching techniques. The method of production involves dissolving the polybenzimidazole resin in a suitable solvent to produce a polybenzimidazole solution followed by emulsification-precipitation or atomizing the polybenzimidazole solution onto a static surface of methanol to form the polybenzimidazole particulates.

SUMMARY OF INVENTION

In accordance with the present invention, it has been found that a preferred method of making highly porous, fine polymeric powders which includes the steps of forming a solution of polymers in a solvent, atomizing the solution to form a directed aerosol jet of droplets of polymer solution, and simultaneously with the step of atomizing the polymer solution, atomizing a non-solvent, quenching fluid into a jet coincident with the polymer solution aerosol such that an aggregation zone is defined wherein the droplets of solution associate with the droplets of non-solvent to form aggregates and precipitate the polymer from solution. Thereafter, the aggregate droplets are collected in sufficient non-solvent to ensure precipitation of the polymer into a highly porous powder. Preferably, the system is operated so that substantially all of the polymer solution associates with non-solvent, and no misting of polymer solution occurs. The aggregated droplets are typically collected in a bath of non-solvent.

The polymer solution which contains one or more polymers dissolved in an appropriate solvent, and the non-solvent may be atomized in a variety of ways including airless atomization or electrostatic atomization; however air (or gas-operated) atomization is typically most convenient using gauge pressures from about 10 to 100 psi on both liquid and atomizing gas. While it may be possible to atomize both polymer solution and non-solvent through a single multi-port nozzle, directed nozzles having orthagonally opposed jets are believed superior.

The highly porous compressible polymeric powders of the present invention are useful as mass transfer media and high performance parts.

BRIEF DESCRIPTION OF THE DRAWINGS

While the specification concludes with claims particularly pointing out and distinctly claiming the present invention, it is believed that the present invention will be better understood from the following description in conjunction with the accompanying drawings in which:

FIG. 1 is a schematic view in elevation of an atomization reactor utilized to practice the process of the present invention;

FIG. 2 is a plot illustrating the incremental pore volume versus pore radius of the particles of the invention as opposed to melt derived powder;

FIG. 3(*a*) is an electron microscope photograph of a shard polybenzimidazole particle;

FIG. 3(*b*) is an electron microscope photograph of a fibrid polybenzimidazole particle;

FIG. 3(*c*) is an electron microscope photograph of the highly porous polybenzimidazole particle produced by the process of this invention; and FIG. 4 is a set of compressibility curves representing disks produced from fine, coarse and atomized Isaryl 25H.

DETAILED DESCRIPTION OF THE INVENTION

Many different types of polymers may be used in connection with the present invention, especially those which are not readily melt-processable. Partially or wholly aromatic aramids, for example, are of this category such as the poly(p-benzamides) or poly(p-phenylene terephthalamides). Likewise, the high temperature polyimides (or their polyamic acid precursors) of, for example, pyromellitic anhydride may be formed into porous powders by the method of the present invention.

Polybenzimidazoles, polybenzimidazolones, polybenzoxazoles and polybenzthiozoles are examples of heterocyclic polymers that may be processed in accordance with the present invention, polybenzimidazoles perhaps being the most preferred. Other intractable polymeric resins, e.g., polyesters, polyimides, polyamides, polyamideimides, partial and wholly aromatic aramides, as well as nylons of hexamethylene diamine and terephthalic acid, polyarylktones, polyarylsulfides, etc., and mixtures thereof may be dissolved alone or in combination and atomized to form a composite powder. A suitable polymer solution will contains at least about 5 weight percent of polybenzimidazole solids.

Polybenzimidazoles (PBI) useful in connection with this invention may comprise any polybenzimidazole resin known to those skilled in the art. Typical polymers of this class and their preparation are more fully described in U.S. Pat. No. 2,895,948; U.S. Pat. No. Re. 26,065, and in the Encyclopedia of Polymer Science and Engineering, Vol. 11, pages 573-577 (1988), which are incorporated herein by reference. A preferred polybenzimidazole for use in the present invention is poly-2,2'-(m-phenylene)-5,5'-bibenzimidazole, the recurring unit of which is:

Various methods may be used to prepare the polybenzimidazoles used in the examples which follow. Representative techniques for preparing polybenzimidazoles are disclosed in U.S. Pat. Nos. 3,509,108; 3,549,603; and 3,551,389, which are herein incorporated by reference.

Generally, the first step of the inventive process is to form a solution or dope of polymeric resin dissolved in a suitable solvent. The polymeric solution utilized generally contains approximately 5 to approximately 25 percent by weight of polymer solids. Typically, however, the solution will contain approximately 10 to approximately 20 percent by weight of polymer solids and preferably, from approximately 12 to approximately 15 percent by weight of polymer solids is utilized.

The solvents utilized to form the resin solution or dope include those solvents which are commonly recognized as being capable of dissolving the particular polymer resin being used. For instance, those solvents which are commonly utilized in the formation of dry spinning solutions. Illustrative examples of suitable solvents include N,N'-dimethylacetamide, N,N'-dimethylformamide, dimethylsulfoxide, and N-methyl-2-pyrrolidone. Additional representative solvents include formic acid, acetic acid, sulfuric acid, polyphosphoric acid, and methanesulfonic acid. Particularly, the preferred solvent is N,N'-dimethylacetamide (DMAc) having a concentration of from about 90 to about 100 percent and preferably about 99 percent by weight.

Methods of dissolving different polymers in a variety of solvents are known to those skilled in the art. One suitable method for dissolving polybenzimidazoles is by mixing the materials at a temperature above the boiling point of the solvent at standard conditions, for example, about 25° to about 120° C. above such boiling point, at a pressure of about 2 to about 15 atmospheres for a period of about 1 to about 5 hours. Preferred conditions for a polybenzimidazole may comprise heating the mixture in a stainless steel reactor at a pressure of about 7 atmospheres for about 2 hours at a temperature of about 235° C. The resulting solution is preferably filtered to remove any undissolved polymer. A minor amount of lithium chloride, e.g., about 2 percent by weight, optionally, may be provided in the solution in order to prevent the polymer from phasing out of the solution upon standing for extended periods of time.

The non-solvent component for the present invention is any substance which can be atomized or formed into an aerosol in which the polymer to be processed is substantially insoluble. Generally, the non-solvents include water and $C_1$ to $C_4$ aliphatic alcohols. However, any component that is insoluble with the polymer is sufficient. Typically, the non-solvent component is water.

An atomization reactor system, as illustrated in FIG. 1, is utilized to produce the highly porous particles of the invention. The reactor system (10) has a cylindrical vessel (12) with upstanding side walls (14) and a cone-shaped bottom (16) with an outlet (18) equipped with a particle separation system (20). Typical reactor dimensions are about 36 inches in diameter by about 37 inches in height. A plurality of nozzles are contained within the reactor. The first set of nozzles (22), slidably attached to the top-center of the reactor, are utilized to atomize the resin solution downwardly into the reactor. A second set of nozzles (24), equaling about four times the quantity of the first nozzle set, separated into an equal number of rows (i.e., four), equally spaced and attached to the reactor side walls at positions well below the first nozzle set, are utilized to atomize the non-solvent component in a direction perpendicular to that of the resin solution jet, that is horizontally into the reactor to create an aggregation zone. A recirculation pump (26) is positioned in the bottom of the reactor to maintain suspension of the rounded particles in the non-solvent solution prior to discharging through outlet (18).

The atomization nozzles, manufactured by Spraying Systems of Wheaton, Ill., produce a wide-angle rounded spray pattern using a No. 1 spray set-up containing Fluid Cap 2050 and Air Cap 64. Under normal operation at 60 psi the nozzles are capable of delivering 0.79 gallons of liquid per hour at a spray angle of about 18 degrees. The polymer solution is pumped from a reservoir through a filtering system (28) to remove undissolved resin before feeding it through the first inlet of nozzles (22). To aid atomization, a gas such as air or nitrogen is fed into a second inlet of the nozzles (22) as is typical of gas-operated atomization nozzles. These nozzles (22) are suspended along the upper-vertical axis of the reactor in such a way as to spray fine droplets of the resin solution down into the reactor. The non-solvent component (e.g., water or alcohol) is fed into a first inlet of each of the second set of nozzles (24) while a compressed gas such as air or nitrogen is fed into a second inlet of each second nozzle (24) to aid in atomization.

During operation of the reactor, the polymer solution aerosol jet is discharged from the first set of nozzles (22)

downwardly into the atomized atmosphere of the non-solvent component, which is discharging horizontally into the aggregate (i.e., reaction) zone (30) in the form of an aerosol jet from the second set of nozzles (24). The two jets cooperate to form the highly porous particles. An initial quantity of non-solvent component, e.g., water, is accumulated in the reactor bottom to maintain suspension of the highly porous particles as they are formed, as well as to complete any residual precipitation from solution that may be necessary. Typically, the reactor is operated at atmospheric pressure, but other pressures are possible. The contents in the bottom of the reactor (i.e., polymeric particles suspended in the solvent/non-solvent mixture) are constantly recirculated to aid in suspension of the particles before discharging through outlet (18). To separate the suspended particles from the solvent/non-solvent solution, the outlet of the reactor is typically equipped with a separation system (20). The separation system can comprise any of several methods known in the art including vacuum and pressurized filtration, and centrifugation. For example, the particles can be collected on the filter and washed to remove residual solvent and non-solvent components, or the slurry can be centrifuged to produce a wet cake which can be washed and dried. The wet cake that results after filtration or centrifugation must be dried to a controlled or defined moisture content. One of several approaches can be adopted 1) wet cake powder can be dried to lower non-solvent content (<7 wt. %) and humidified to the desired moisture content (7-12 wt. %); or 2) the wet cake powder can be dried directly to the desired moisture content (when the non-solvent is water). Thereafter, the dried, free-flowing highly porous particles can be milled and screened if so desired to produce submicron particles which yield an even higher apparent density powder which compacts into disks having high bulk densities.

Cold compactible polybenzimidazole powder produced by the process of this invention exhibits a mean particle size ranging from about 20 to about 100 $\mu$m; a surface area ranging from about 20 to about 80 $m^2/gm$; a porosity ranging from about 0.5 to about 1.5 $cm^3/gm$; a pore radius ranging from about 20 to about 600 Angstroms; and an ASTM No. D-1895-89 apparent density ranging from about 0.100 to about 0.300 $gm/cm^3$.

There are several ways to control the size of the highly porous particles. For instance, size can be controlled by adjusting the viscosity of the polymer solution thru control of nozzle temperature and/or polymer concentration in the solution and adjusting the amount of non-solvent component droplets in the atmosphere. Moreover, the particle size can be changed by adjusting pressure on the nozzles, especially the polymer solution nozzles (22).

Following are examples illustrative of preparing highly porous particles in accordance with the present invention. They are provided for purposes of exemplification only as should be appreciated from the foregoing discussion.

EXAMPLE I

Following the procedure described above, poly-2,2'-(m- phenylene)-5,5'-benzimidazole (PBI) resin was dissolved into DMAc to make a 12 weight percent PBI solids solution. The PBI solution was fed through a pumping system to the first set of nozzles in the reactor at about 12.4 $cm^3/min$ and about 30 psi. Nitrogen gas at about 15 psi was fed to the same nozzle to atomize the PBI solution. Water (75,700 gm) was purged with nitrogen for 48 hours followed by the addition of 764 gm (1 wt. %) of DMAc thereto. This treated water was fed to the second set of nozzles at a rate of 1080 $cm^3/min$ and a pressure of 25 psi while the dope was being sprayed perpendicular thereto. Highly porous, rounded PBI particles formed as a result of the operation were collected from the bottom of the tank, centrifuged, washed and dried.

The particles were dried in a planetary mixer under 1 atmosphere of $N_2$ for 70 hours at 200° C., and a sieve analysis was performed. The data appears below in Table I.

TABLE I

| SIEVE ANALYSIS | |
|---|---|
| Sieve Size, $\mu$m | Wt. % Retention |
| 600 | 1.13 |
| 300 | 3.27 |
| 150 | 25.70 |
| 74 | 35.19 |
| 53 | 14.0 |
| 37 | 3.42 |
| fines | 17.3 |

EXAMPLE II

The procedure of Example I was followed except that the PBI-DMAc solution was fed at about 24.8 $cm^3/min$ and 58 psi along with nitrogen at 40 psi into the first set of nozzles. After purging 75,700 gm of water with $N_2$ for several days, 1528 gm of DMAc (about 2 wt. %) were added. The water was fed at a rate of 600 $cm^3/min$ and 40 psi into the second set of nonsolvent nozzles along with nitrogen at 10 psi. Highly porous PBI particles were collected from the bottom of the reactor, screened, filtered, washed in methanol and hexane, dried in a planetary mixer under 1 atmosphere of $N_2$ for 70 hours at 200° C., and analyzed for particle size. This powder was slightly coarser than the powder of Example I as can be seen below in Table II.

TABLE II

| SIEVE ANALYSIS | |
|---|---|
| Sieve Size, $\mu$m | Wt. % Retention |
| >600 | 1.28 |
| 600–300 | 1.60 |
| 300–150 | 6.01 |
| 150–74 | 37.61 |
| 74–53 | 21.92 |
| 53–37 | 15.53 |
| <37–fines | 16.06 |

Thereafter particles were divided into fractions greater than (>) and less than (<) 37 $\mu$m for analyses.
Particle size: >37 $\mu$m.
BET Surface Area: 36 $m^2/gm$.
Particle size: <37 $\mu$m.
BET Surface Area: 18 $m^2/gm$.

EXAMPLE III

The procedure of Example II was substantially repeated with the following exceptions:
PBI-DMAc feed: 24.8 $cm^3/min$ at 65 psi;
Nitrogen feed (PBI-DMAc): 40 psi;
Water feed: 600 $cm^3/min$ at 50 psi; and
Nitrogen feed (water): 10 psi.
The powder was recovered by centrifuging without prescreening and washed in hot water followed by centrifuging three times. Finally, the powder was dried in a planetary mixer under 1 atmosphere of $N^2$ for 22 hours at 200° C. A representative analysis of the powder is as follows:

Moisture content: 11.5–12.7 wt. %.
DMAC content: 0.5 wt. %.
LiCl Content: <20 ppm.
BET Surface Area: 59 $m^2$/gm.
Mean particle Size: <150 μm.

Figure 2:
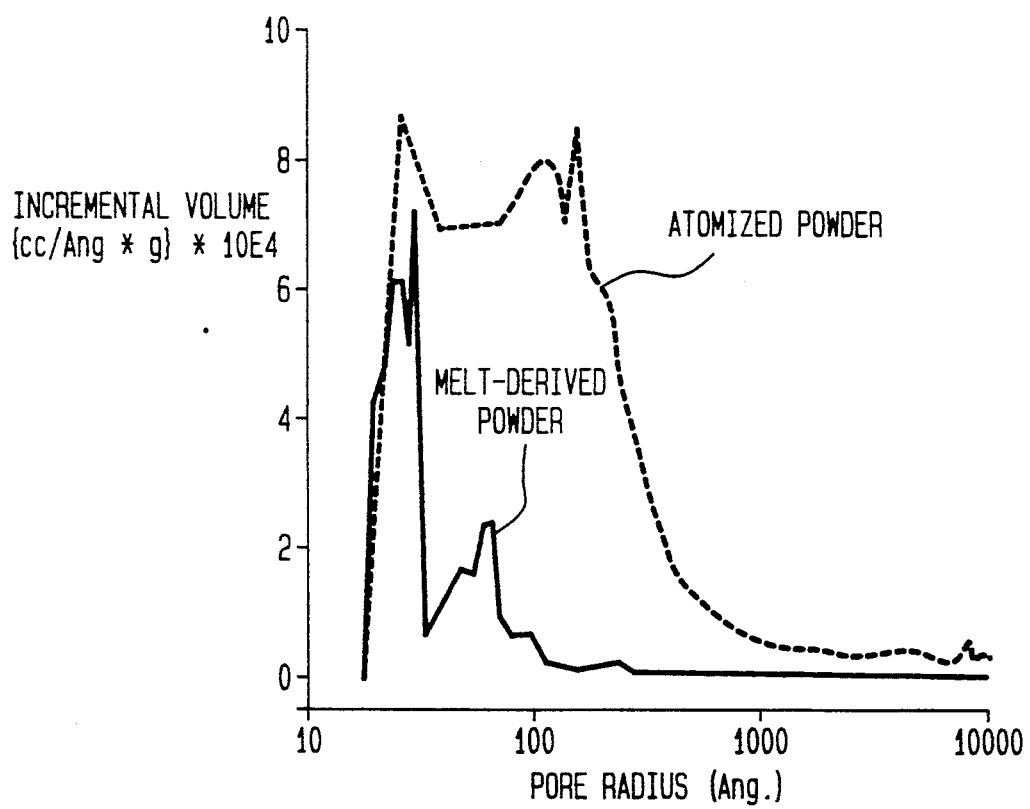

The atomized PBI powder of this invention is characterized by relatively high porosity as well as relatively high apparent density. FIG. 2 represents a plot of the incremental pore volume versus the pore radius of melt-derived and atomized PBI powder. The total porosity, measured by mercury intrusion analysis, of the atomized powders of this invention is from about 0.5 to about 2.0 $cm^3$/gm of polybenzimidazole, whereas, the total porosity of melt-derived powder is typically only about 0.02 $cm^3$/gm of polybenzimidazole. This internal porosity is believed to promote cold compaction by allowing the particles to crush and pack more efficiently. The total pore volume of the atomized polybenzimidazole powder is about 0.885 $cm^3$/gm, and the total pore volume of the melt-derived powder is only about 0.0213 $cm^3$/gm.

Figure 3C:
Figure 3B:
Figure 3A:

FIG. 3(a) represents electron microscope photography of shard-like particles which are produced from melt-derived polybenzimidazole by the process of crushing the synthesis reactor product. FIG. 3(b) represents an electron microscope photograph of a fibrid particle produced by the atomization of dissolved polybenzimidazole resin into a static quenching solution of alcohol. FIG. 3(c) is an electron microscope photograph of the highly porous polybenzimidazole particles produced by the process of this invention. The rounded particle morphology of the product in 3(c) contribute excellent flow elastic to this powder. Flowability of fibrid particle in 3(b) is very poor. Flowability is necessary for smooth powder feeding in automated presses. The particles depicted in FIGS. 3(a) and 3(b) contain very little surface porosity as compared to those of FIG. 3(b) and 3(c).

EXAMPLE IV

A 50/50 weight percent mixture of polybenzimidazole and Isaryl 25H (Isaryl 25H is an aromatic polyester manufactured by Isonova Technische Innovationen G.m.b.H of Austria) powders were dissolved in DMAc to form a solution containing 12 weight percent polymer solids. Following the procedure of Example III, generally, 4.4 kg of the solution was atomized at a rate of 12.4 $cm^3$/minute and a pressure of about 30 psi with the assistance of $N_2$ gas at a pressure of about 15 psi. The non-solvent quench fluid, water, was fed to the nozzle at a rate of 1080 $cm^3$/min and a pressure of about 25 psi. The atomized polymers in solution contacted the atomized water to form polymer particles which were filtered, washed and dried. The particles exhibited a porosity ranging from about 0.69 to about 1.41 $cm^3$/gm, and a surface area of about 81 $m^2$/gm. This powder was dried, moisturized and pressed into disks for measurement of the bulk density. Results are reported below in Table III.

TABLE III

| 50 wt. % PBI/50 wt. % ISARYL 25H ATOMIZED POWDER DISKS | |
|---|---|
| Applied Pressure, × $10^3$ psi | Bulk Density, gm/$cm^3$ |
| 3 | 0.5057 |

TABLE III-continued

| 50 wt. % PBI/50 wt. % ISARYL 25H ATOMIZED POWDER DISKS | |
|---|---|
| Applied Pressure, × $10^3$ psi | Bulk Density, gm/$cm^3$ |
| 5 | 0.6124 |
| 7 | 0.6952 |
| 9 | 0.8023 |
| 15 | 0.9052 |

Neat Isaryl 25H solutions containing 12 and 15 weight percent polymer solids exhibit high viscosities at standard temperature and pressure conditions, i.e., about 60 and about 80 poise, respectively. Blends of PBI and Isaryl 25H solutions exhibit lower viscosities than either neat solution. In the case of a 50/50 weight percent (PBI/Isaryl 25H) solution of 12 and 15 weight percent polymer solids, viscosities were measured at about 3 and about 10 poise, respectively. Conversely, as the amount of PBI to Isaryl was increased to about 75 weight percent PBI, the viscosities of the 12 and 15 weight percent polymer solids solutions increased to about 5 and about 12 poise, respectively. The minimum viscosity of a blend of PBI and Isaryl 25H powders occurs at about 50/50 weight percent PBI to Isaryl 25H.

EXAMPLE V

Neat Isaryl 25H was dissolved in DMAc to produce an 8 weight percent solution and processed similar to Example III. After initially filling the reactor bottom with water, 5106 gm. of the solution was fed through a nozzle into the reactor at a rate of 12.4 $cm^3$/min and a pressure of about 30 psi along with nitrogen gas at a pressure of about 15 psi. The non-solvent, water, was fed to the nozzles at a rate of 1080 $cm^3$/min and a pressure of about 25 psi. Particles formed during the operation were filtered, collected, washed and dried (theoretical density was 1.301 gm/$cm^3$). The dried powder was humidified at 80° C. relative humidity to a 1 wt. % moisture content.

Powder produced by this example was pressed into disks at applied pressures from about 3,000 to about 50,000 psi. Bulk and relative densities of Isaryl 25H atomized powder are reported below in Tables IV and V.

TABLE IV

| ISARYL 25H ATOMIZED POWDER DISKS | |
|---|---|
| Applied Pressure × $10^3$ psi | Bulk Density, gm/$cm^3$ |
| 0 | 0.113 |
| 3 | 0.5297 |
| 5 | 0.6556 |
| 7 | 0.7417 |
| 9 | 0.8146 |
| 15 | 0.9599 |
| 20 | 1.1124 |
| 30 | 1.16 |
| 40 | 1.1792 |
| 50 | 1.1834 |

TABLE V

| ISARYL 25H ATOMIZED POWDER DISKS | |
|---|---|
| Applied Pressure, × $10^3$ psi | Relative Density*, (%) |
| 0 | 8.7 |
| 3 | 40.7 |
| 5 | 50.4 |

TABLE V-continued
ISARYL 25H
ATOMIZED POWDER DISKS

| Applied Pressure, ×10³ psi | Relative Density*, (%) |
|---|---|
| 7 | 57.1 |
| 9 | 62.7 |
| 15 | 73.8 |
| 20 | 85.6 |
| 30 | 89.2 |
| 40 | 90.7 |
| 50 | 91.0 |

*% Relative Density = $\frac{\text{Bulk Density}}{\text{Theoretical Density}} \times 100\%$

COMPARATIVE EXAMPLE A

Coarse Isaryl 25H polyester powder having a particle size 50 to 400 μm, i.e., coarse powder, a theoretical density (measured by He pycnometry) of 1.302 gm/cm³, essentially no internal porosity and low surface area (<1 m²/gm) was moisturized to about 1 wt. % and cold compacted into disks at various pressures. Bulk and relative densities of the disks are reported below in Tables VI and VII.

TABLE VI
ISARYL 25H
COARSE POWDER DISKS

| Applied Pressure, ×10³ psi | Bulk Density, gm/cm³ |
|---|---|
| 0 | 0.187 |
| 3 | — |
| 5 | — |
| 7 | 0.6108 |
| 9 | 0.6687 |
| 15 | 0.7921 |
| 20 | 0.8837 |
| 30 | 0.8959 |
| 40 | 0.9008 |
| 50 | 0.8984 |

TABLE VII
ISARYL 25H
COARSE POWDER DISKS

| Applied Pressure, ×10³ psi | Relative Density, (%) |
|---|---|
| 0 | 14.4 |
| 3 | — |
| 5 | — |
| 7 | 47.0 |
| 9 | 51.4 |
| 15 | 60.9 |
| 20 | 68.0 |
| 30 | 68.9 |
| 40 | 69.3 |
| 50 | 69.1 |

COMPARATIVE EXAMPLE B

Fine Isaryl 25H polyester powder having a particle size of 50 to 125 μm, a theoretical density (measured by He pycnometry) of 1.302 gm/cm³, essentially no internal porosity and low surface area (<1 m²/gm) was moisturized to about 1 wt. % and compressed, i.e., cold compacted, into disks at various pressures, and the bulk and relative densities were measured. The data appears below in Tables VIII and IX.

TABLE VIII
ISARYL 25H
FINE POWDER DISKS

| Applied Pressure, ×10³ | Bulk Density, gm/cm³ |
|---|---|
| 0 | — |
| 3 | — |
| 5 | 0.7 |
| 7 | 0.753 |
| 9 | 0.7963 |
| 15 | 0.8829 |
| 20 | 0.9642 |
| 30 | 0.9861 |
| 40 | 0.9851 |
| 50 | 0.9858 |

TABLE IX
ISARYL 25H
FINE POWDER DISKS

| Applied Pressure, ×10³ psi | Relative Density, (%) |
|---|---|
| 0 | 21.8 |
| 3 | — |
| 5 | 54.7 |
| 7 | 58.2 |
| 9 | 62.1 |
| 15 | 68.2 |
| 20 | 74.2 |
| 30 | 75.9 |
| 40 | 75.8 |
| 50 | 75.8 |

Figure 4:
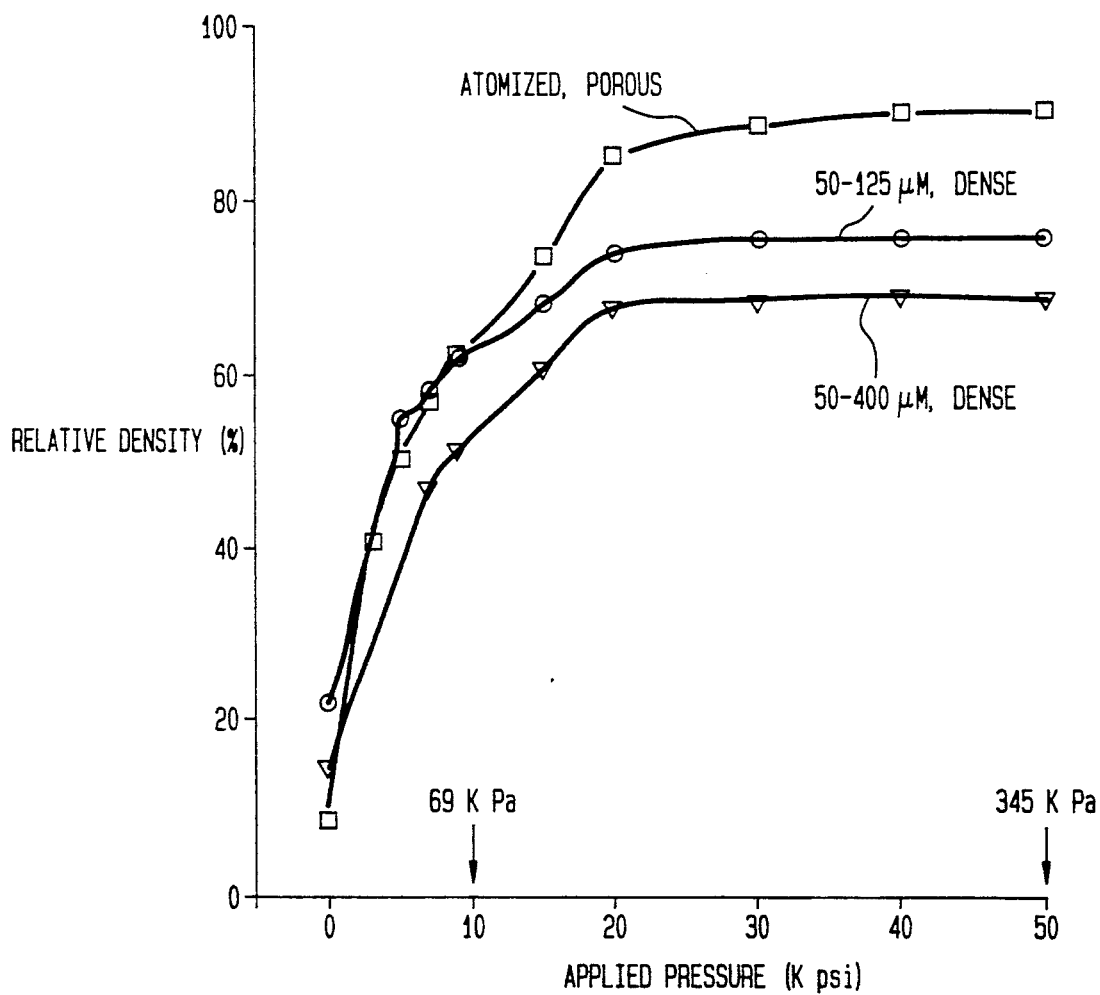

FIG. 4 represents a compressibility curve of relative density versus applied pressure for three different Isaryl 25H powders. The non-porous 50 to 125 μm and 50 to 400 μm powders, as received from the manufacturer, were compressed into disks. The porous atomized powder was made in accordance with the process of this invention and pressed into disks. While the finer particles received from the manufacturer, i.e., 50 to 125 μm, yielded better relative densities at equal pressures when compressed into disks, the atomized powder disks exhibited superior relative densities to the non-atomized powder disks.

COMPARATIVE EXAMPLE C

The procedure described in U. S. Pat. No. 4,628,067 to Chen et al., Example IV, was followed to produce a PBI powder. This procedure was essentially that described above, except that the polymer solution was atomized onto a static quench fluid bath and no quench side-spray was utilized. A 15% by weight solution of poly-2,2'-(m- phenylene)-5,5'-benzimidazole solids in DMAc was sprayed through a 16 nozzle utilizing air assistance at 30 psi at a rate of 0.5 gal/hr. into a methanol static quench fluid bath at ambient temperature. The nozzle was located 18 inches above the surface of the bath. The spherical PBI particles were recovered from the bath were filtered, washed, and dried. The apparent density of PBI powders prepared by various methods was about 0.10. The apparent densities of various PBI powders are presented for comparison below in Table X.

TABLE X

| PBI Powder Type | Apparent Density, gm/cm³ |
|---|---|
| Fibrid | 0.079 |
| Atomization, Static Quench Fluid | 0.10–0.11 |
| Atomization, Spray Quench Fluid | 0.14–0.18 |

Powders, especially polymer powders, are most useful in compression molding-type operations if they exhibit, among other desirable characteristics, high apparent density. Powders with high apparent densities can be compressed to maximum density with smaller compression ratios, i.e., the ratio of powder height in a mold before compression to the height after compression.

Unless otherwise indicated, apparent densities were measured throughout this document in accordance with ASTM D-1895-89; commonly referred to as the loose bulk density of a powder. Polymer powders produced by gas-assisted atomization have different apparent densities depending on 1) the dope nozzle orientation with respect to the quench fluid, and 2) whether or not the quench fluid is atomized. High apparent densities result from the process of this invention if both the polymer solution and the quench fluid are atomized and caused to mix while both are suspended as droplets in air (or other gas) so that polymer precipitation occurs in this state of suspension. If the atomized polymer spray is quenched by directing it into a static quench fluid layer, a lower apparent density result as may be appreciated from the foregoing.

Very low apparent densities result if the quench fluid is not atomized and the polymer nozzle is submerged below the surface of the quench fluid. The polymer particles produced in this manner have a fibrid morphology which greatly reduces their packing ability. Low apparent densities are the consequence. Low apparent densities also result if the quench fluid is not atomized and the polymer nozzle is directed at a static quench fluid layer, as in accordance with Chen et al. Clearly, the PBI powder produced by the atomization-spray quenching process of the present invention displays a superior apparent density to PBI powder produced by the process of Chen et al.

We claim:

1. A process of producing a highly porous powder from a polymeric material comprising the steps of:

(a) forming a polymer solution in a solvent;

(b) atomizing said polymer solution to form a first directed aerosol jet of droplets of said solution;

(c) simultaneously with said step of atomizing said solution into droplets, atomizing a liquid non-solvent to form a second directed, aerosol jet formed of droplets of said liquid non-solvent, said first and second directed jets being coincident so that they cooperate to form an aerosol aggregation zone where the droplets of polymer solution associate with the liquid non-solvent so as to aggregate; and (d) collecting the aggregated droplets such that sufficient liquid non-solvent is present to precipitate the polymer from the solvent into a highly porous powder.

2. The process according to claim 1 wherein substantially all of the polymer solution is associated with liquid non-solvent in the aerosol phase.

3. The process according to claim 1 wherein said steps of atomizing said polymer solution and said liquid non-solvent are achieved by way of at least one gas operated atomizing nozzle.

4. The process according to claim 3 wherein said nozzle is operated at pressure of from about 10 to about 100 psi.

5. The process according to claim 1 wherein said polymer solution is atomized through at least a first gas operated atomizing nozzle and said liquid non-solvent is atomized through at least a second gas-operated atomizing nozzle wherein said first and second nozzles are positioned so that their outlet jets are substantially perpendicular.

6. The process according to claim 1 wherein the aggregation of liquid non-solvent droplets and polymer solution droplets are collected in a bath of non-solvent.

7. The process according to claim 1 wherein the polymer solution contains from about 1 to about 25 weight percent of polymer solids.

8. The process according to claim 1 wherein the solution contains from about 5 to about 20 weight percent of polymer solids.

9. The process according to claim 1 wherein the solvent is selected from the group consisting of N,N'-dimethylacetamide, N,N'-dimethylformamide, dimethylsulfoxide, methanesulfonic acid, N-methyl-2-pyrrolidone, and polyphosphoric acid.

10. The process according to claim 1 wherein the liquid non-solvent is selected from the group consisting of water, a $C_1$ to $C_4$ aliphatic alcohol and mixtures thereof.

11. The process according to claim 3 wherein the gas is nitrogen or air.

12. The process according to claim 1 wherein the polymer is selected from the group consisting of polybenzimidazoles, polybenzimidazolones, polybenzoxazoles, polybenzthiozoles, polyesters, polyimides, polyamides, polyamideimides, partial and wholly aromatic aramides, nylons of hexamethylene diamine and terephthalic acid, polyarylketones, polyarylsulfides, and mixtures thereof.

13. The process according to claim 12 wherein the polymer is polybenzimidazole.

14. The process according to claim 10 wherein the liquid non-solvent is water.

15. The process according to claim 13 wherein the polybenzimidazole is poly-2,2'-(m-phenylene)-5,5'-bibenzimidazole.

16. The process according to claim 1 wherein the polymer is intractable.

17. The process according to claim 1 wherein said polymer solution contains at least two polymers.

18. The process according to claim 17 wherein the polymers are selected from the group consisting of polybenzimidazoles, polybenzimidazolones, polybenzoxazoles, polybenzthiozoles, polyesters, polyimides, polyamides, polyamideimides, partial and wholly aromatic aramides, nylons of hexamethylene diamine and terephthalic acid, polyarylketones, polyarylsulfides, and mixtures thereof.

19. The process according to claim 18 wherein the two polymers are polybenzimidazole and polyester.

20. The process according to claim 19 wherein the powder contains about 50 weight of polyenzimidazole and 50 weight percent of polyester.

* * * * *